Sept. 4, 1956 W. J. RONAN 2,761,322
CONTROL FOR POWER TAKE-OFF
Filed Aug. 13, 1954 4 Sheets-Sheet 1

INVENTOR.
William J. Ronan.
BY
Harness, Dickey & Pierce
ATTORNEYS.

Sept. 4, 1956 W. J. RONAN 2,761,322
CONTROL FOR POWER TAKE-OFF
Filed Aug. 13, 1954 4 Sheets-Sheet 2

INVENTOR.
William J. Ronan.
BY
Harness, Dickey & Pierce
ATTORNEYS.

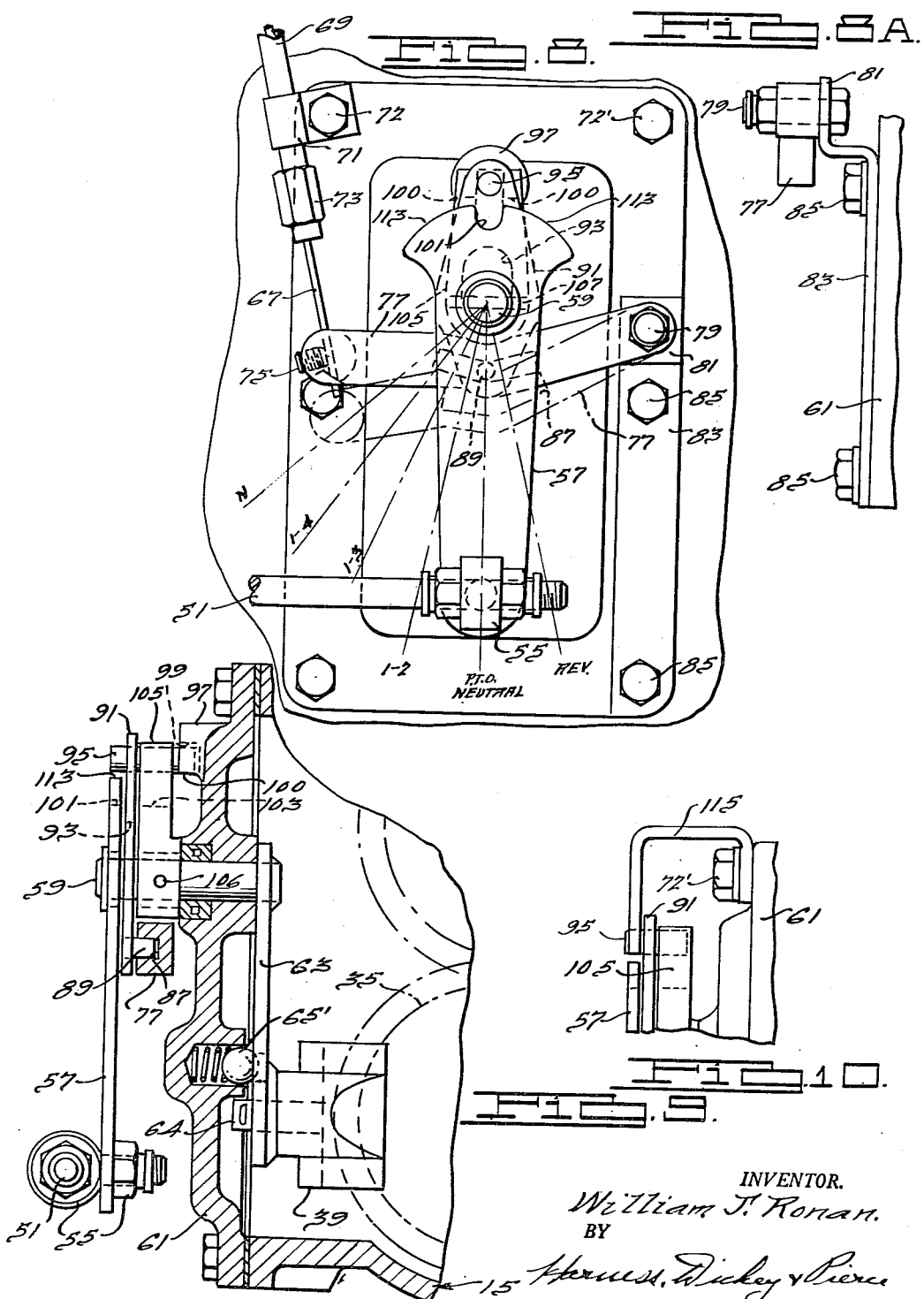

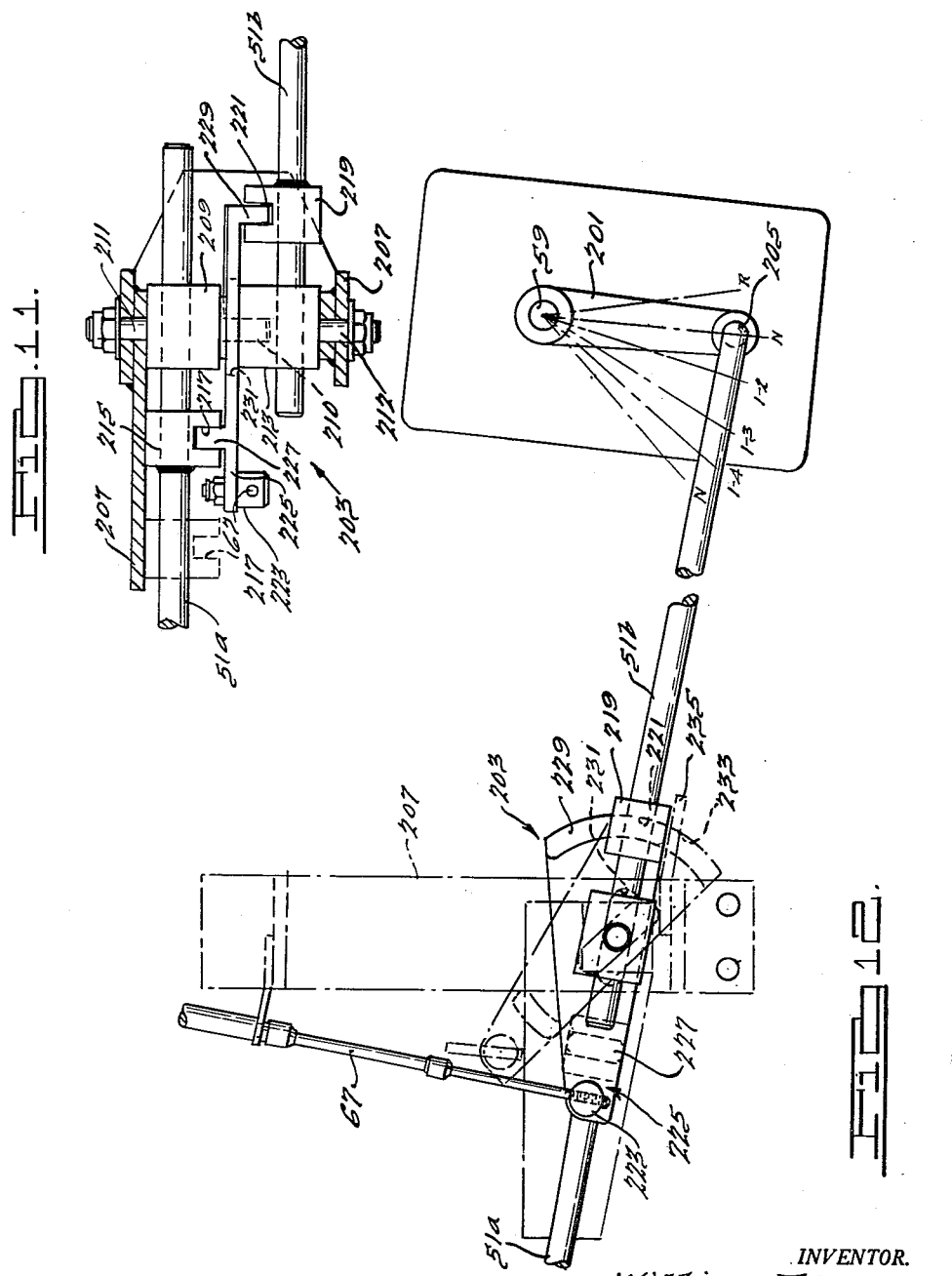

United States Patent Office 2,761,322
Patented Sept. 4, 1956

2,761,322

CONTROL FOR POWER TAKE-OFF

William J. Ronan, Detroit, Mich., assignor to Gar Wood Industries, Inc., Wayne, Mich., a corporation of Michigan Application August 13, 1954, Serial No. 449,554

8 Claims. (Cl. 74—15.86)

My invention relates to power transmission systems for trucks and the like and in particular to controls for power take-off (P. T. O.) systems driven by the truck engine.

It is common practice for truck engines to be used to supply power for uses other than driving the wheels of the truck, for example, to raise and lower dump bodies. Special take-off units can be purchased by the truck owner for installation on his vehicle to provide a power outlet for these uses; and the truck manufacturers usually design into the auxiliary transmission a place where the take-off units can be attached to receive power from the truck engine. The point of power take-off usually comprises a gear meshing with a gear in the auxiliary transmission so it will be seen that the direction of rotation of the take-off gear and its speed of rotation depend upon the position the main truck transmission is in. However, the P. T. O. is usually used to drive a pump or a winch and these must not be driven at excessive speeds or in reverse directions. The present invention provides a control for the take-off system which automatically insures its safe operation despite the difference which exists between its requirements and the nature of the torque furnished to it by the main truck transmission system.

It is an object of my invention to provide a power take-off control that can be supplied as an accessory for optional attachment to standard truck power transmission and take-off systems.

It is also an object of my invention to provide a P. T. O. control that is operated by the standard selector lever used to control the truck transmission, it being a particular object of an embodiment described herein to provide a control operated by the selector lever of a Hydramatic transmission.

Another object of the invention is to provide a P. T. O. control which will activate the P. T. O. at only certain predetermined speeds.

Another object of the invention is to provide a P. T. O. control that will automatically operate the P. T. O. in only a certain predetermined direction.

A further object is to provide a P. T. O. control operated by the standard selector lever that may be locked out so that the P. T. O. is inoperative.

An additional object is to provide a control wherein the P. T. O. can be shifted from operating to neutral position only when the main truck transmission is in a certain predetermined condition.

These and other objects of the invention are provided by a control which, in preferred form, has a shift rod that is clamped to the shifter rod of the main transmission. The shift rod pivots a lever which operates through a connection that may be selectively locked in or out to drive a conventional P. T. O. crank arm and shift gear. In preferred form, the connection includes a pin and slot arrangement acting as key means between the lever and crank arm with the position and possible movement of the pin serving as means for controlling shifting of the P. T. O. into or out of gear.

These and other objects and features of the invention will become evident from the description which follows of the accompanying drawings which have been selected to illustrate the principles of the invention and in which:

Figure 1 is a view showing a part of the cab of a truck using P. T. O. controls according to my invention;

Fig. 2 is a schematic plan view of a power transmission system with a P. T. O. added and using controls according to my invention;

Fig. 3 is a schematic sectional view of an auxiliary transmission;

Fig. 4 is an enlarged view on line 4—4 of Fig. 3 showing the connection of the P. T. O. shifter rod to the Hydramatic transmission shifter rod;

Fig. 5 is a conventional section through a standard forward and reverse P. T. O.;

Fig. 6 is a schematic view of the gearing in the auxiliary transmission and P. T. O. as viewed on line 6—6 of Fig. 2 when the main transmission is in a forward speed;

Fig. 7 is the same as Fig. 6 with the main transmission in a reverse speed and the P. T. O. shifted to maintain the same direction of rotation as in Fig. 6;

Fig. 8 is an enlarged side elevation of the P. T. O. control linkage as seen from line 8—8 of Fig. 2;

Fig. 8a is a side elevation of the strap and lever pivot shown in Fig. 8;

Fig. 9 is a side elevation of the structure in Fig. 8 with parts broken away and parts in section;

Fig. 10 is a partial side elevation of an adapter plate that may be used to provide a lock recess for the lockout shifter pin;

Fig. 11 is a plan view or layout of a modified control connection; and

Fig. 12 is a side elevation of the structure shown in Fig. 11.

Figure 2:
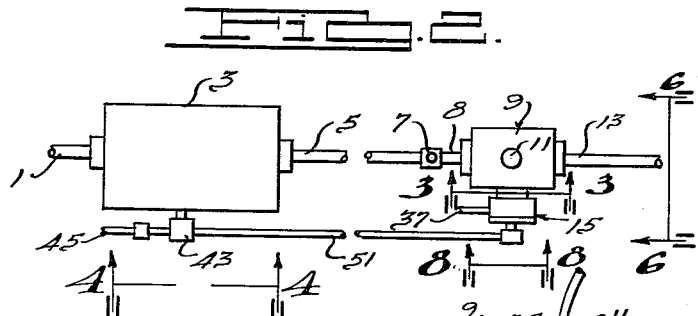

Before explaining the details of a preferred embodiment of my invention, I will first describe a conventional power transmission and power take-off (P. T. O.) system, shown sketchily and diagrammatically in Figs. 2, 3, 5, 6, and 7, so that the objects and advantages of the invention may be more readily understood. In Fig. 2, a shaft 1 driven by the truck engine (not shown) drives the Hydramatic transmission 3. The power output or drive shaft 5 from transmission 3 is connected through a universal joint 7 to the input shaft 8 of an auxiliary transmission 9 (a gear reduction box) operated by a gear shift lever 11. The auxiliary transmission has an output shaft 13 that drives the rear end of the truck. The auxiliary transmission is provided with an opening in the side of its casing over which the P. T. O. 15 is placed and bolted to the transmission so that a gear 17 in the P. T. O. meshes with a gear 19 in the transmission.

In the auxiliary transmission, and simplifying its construction in order to facilitate this description, the clutch element 21 is keyed to input shaft 8 so that it rotates with it but is slidable on it. When the shift lever 11 is moved to slide element 21 to the rear (to the right in Fig. 3), it will engage and drive gear 23 that is fixed on output shaft 13. When the shift lever is moved to slide element 21 forward, it will engage and rotate gear 25 that is mounted on input shaft 8 but not keyed to it. The gear 25 is in mesh with the gear 19 of a gear cluster, the other gear 27 of the cluster being in mesh with the gear 23 mentioned above. As also mentioned above, the gear 19 meshes with P. T. O. gear 17 but it will be seen that gear 19 and therefore gear 17 rotate in one direction when the truck goes forward (Fig. 6) and in the opposite direction when the truck is in reverse.

In the P. T. O. gear box 15, the gear 17 is part of a cluster including a gear 29 (Fig. 5) that meshes with a counter gear 31 on counter shaft 33. A shift gear 35 is splined on P. T. O. output shaft 37 and embraced on one side by a shifter shoe 39 operated in accordance with my invention as hereinafter described. Shifter gear 35 is in a neutral position in Fig. 5 and when shifted up it will mesh with gear 17 to rotate in one direction and when shifted down it will mesh with gear 31 to rotate in the same direction. (The relationship of the gears in Figs. 5–7 does not illustrate meshing of gears 17 and 35 because these figures are double plane sections or views such as conventionally used in the field to illustrate gear box constructions, the gears 31 and 35 actually lying in the same vertical plane and the gear 17 being offset to the left and the shoe 39 offset to the right of this plane.) P. T. O. output shaft 37 therefore always rotates in one direction if the shifter gear 35 is shifted when the truck is shifted between forward and reverse.

My invention provides means to insure that gear 35 is properly shifted when the truck goes from one direction to another and also provides means to prevent operation of the P. T. O. unless the transmission 3 is in the proper speed range.

Figure 1:
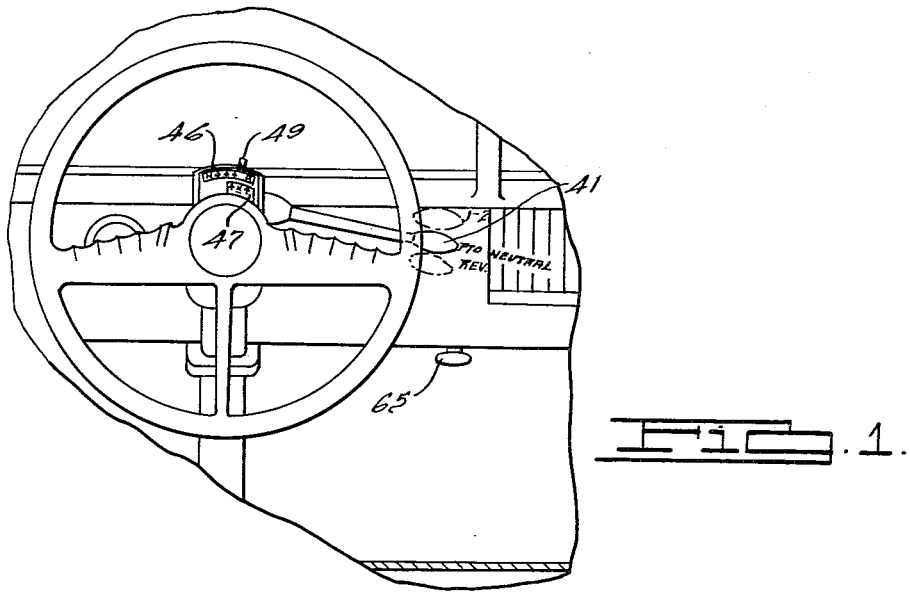
Figures 3, 4:
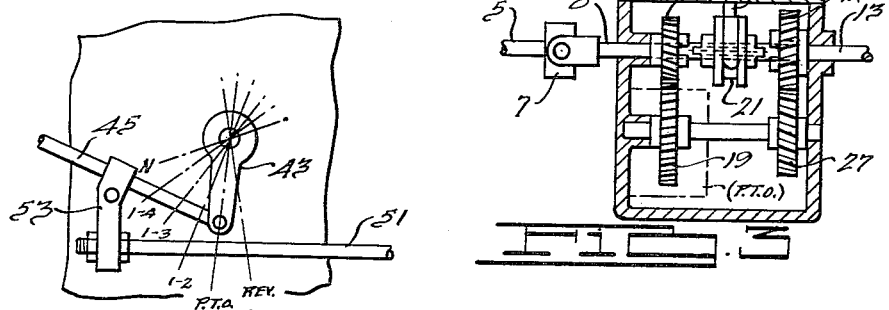
Figure 5:
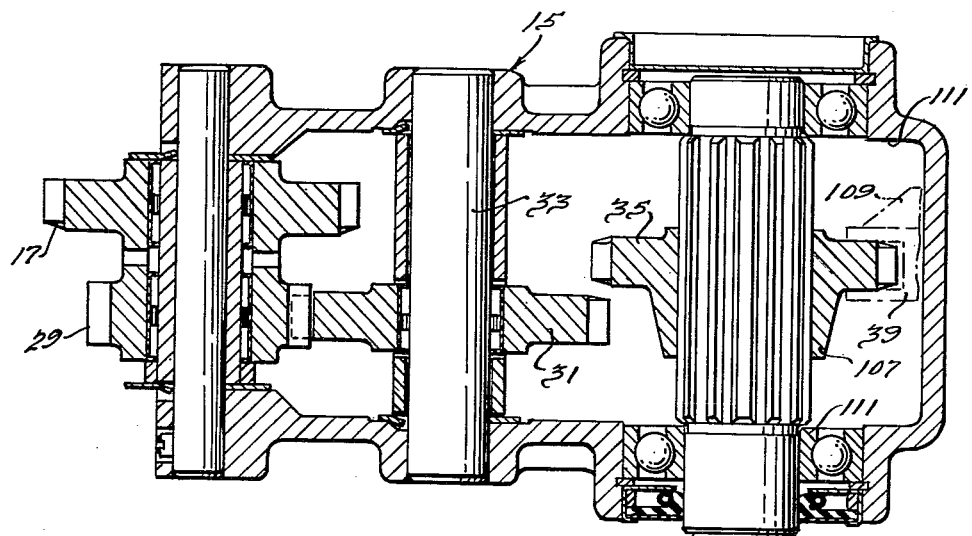
Figure 6:
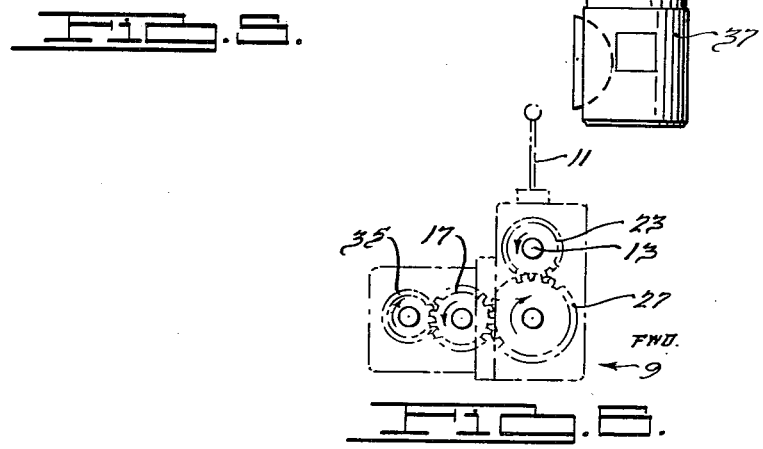
Figure 7:
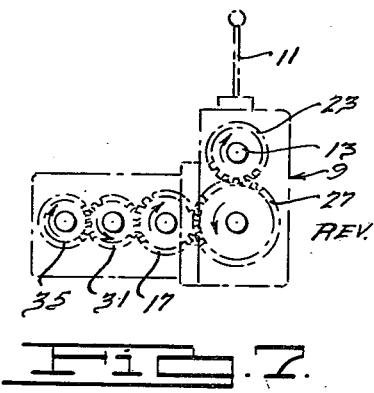

The shift mechanism or power take-off control for shifter gear 35 is conveniently operated by the selector lever (Fig. 1) 41 which controls the speed range of the Hydramatic transmission 3. The lever 41 is connected to the Hydramatic transmission control arm 43 by standard linkage including a rod 45 pivoted to the arm. When the arm 43 is in the angular position marked "Rev" in Fig. 4, the truck will be in reverse gear; and when the arm 43 is in the position marked "1—2," the truck will be in the low speed forward. Between these two positions is the only range in which the P. T. O. will operate with my invention attached. Other speeds and the neutral positions of the arm 43 are shown in Fig. 4 and marked "1—2," "1—3," "1—4," and "N." The selector lever 41 has a conventional range plate 46 with these various markings thereon, it being too small in Fig. 1 to illustrate them. I prefer to add a P. T. O. range plate 47 to the plate 45 and it has arrows aligned with the "1—2" and the "R" markings and an "N" marking about midway between them and which identifies the neutral position of the P. T. O. wherein shifter gear 35 is located in the idle position of Fig. 5. The selector lever pointer 49 cooperates with the range plates 45 and 47 to designate to the truck operator the position in which the selector lever is located.

The P. T. O. control includes a shift rod 51 which is attached at its front end by any suitable means, such as a clamp device 53, to the selector lever rod 45 so that the longitudinal positions of the rods 45 and 51 are fixed relative to each other and determined by selector lever 41. The shift rod 51 is connected to the shoe 39 through linkage best shown in Figs. 8–9.

The rod 51 is pivoted by a suitable coupling 55 to the bottom of lever 57 which is pivoted on, but does not rotate, a pin 59 that is journaled in P. T. O. cover 61. The pin 59 is fixed to and rotates a crank arm 63 which at its lower end pivotally carries by pin 64 the gear shifter shoe 39, a spring loaded detent ball 65' in the cover 61 cooperating with recesses in arm 63 to releasably hold the arm in one of its three positions, viz., neutral, 1—2, and reverse. It will be seen that if a connection is provided between lever 57 and pin 59 the arm 63 will be pivoted to shift gear 35. However, in the full line position of the parts in Figs. 8–9 the lever 57 is free to pivot on pin 59 without moving it through all positions including N, 1—4, and 1—3. In other words the lever 57 is ineffective regardless of the position of the selector lever 41 and the P. T. O. is locked out.

In order to lock in the P. T. O. the operator must release a handle 65, similar, if desired, to a parking brake handle, in the cab and this will move stiff wire 67 in tubing 69 which extends from the cab of the truck to the P. T. O. 15, the tubing 69 being secured by a clamp 71 to a cover bolt 72 of the P. T. O. and having a fitting 73 at the end out of which the wire extends. The wire 67 is fixed by set screw and fitting 75 to one end of a lever 77, the other end of the lever being pivoted on pin 79 to an offset 81 in strap 83 that is secured by cover bolts 85 to the P. T. O. cover 61. When the cab handle 65 is released, it pushes wire 67 down and this pivots the lever 77 down to its dotted line position in Fig. 8 which will provide a connection between lever 57 and pin 59.

The lever 77 has a curved groove 87 in it that receives a pin 89 that projects transversely from the bottom of a link 91. The link pivots on pin 59 but is slotted at 93 so that it can be raised or lowered by the lever 77 acting on pin 89. The top of link 91 has a fixed transverse pin or key 95 projecting in both directions. The bottom part of pin 95 fits between legs of boss 97, which define a slot 99, when the lever 77 is in the up or unreleased position and this positively prevents pivoting of link 91. When the lever 77 is in down or released position, however, the top part of pin 95 fits in a slot 101 in the top of lever 57; and it will be seen that with the lever 77 down the lever 57 will pivot the link 91 and its pin 95. The pin 95 always works in a slot 103 of crank arm 105 that is fixed by cross pin 106 to pivot pin 59. Thus, with lever 77 down, shifting of rod 51 will pivot lever 57 and this will act through pin 95 to drive crank arm 105 which in turn rotates pin 59 and pivots crank arm 63 to move shoe 39 and shift gear 35 to a position dependent upon the angular position of selector lever 41 and shift lever 57. Abutment of the hub 107 on gear 35 and nose 109 on shoe 39 with the sides 111 of the P. T. O. casing serve as limit stops to prevent overshifting of lever 41 to undesired positions, the 1—3 position, for example.

In order to prevent lowering of lever 77, by releasing handle 65 and moving wire 67, when the P. T. O. is not in the neutral, out of gear, position, there are wings 113 on the top of lever 57 lying just below the pin 95 when the lever 77 is in up position. If lever 57 is not in neutral position, its slot 101 will not be aligned with pin 95. Instead, one of the shoulders or wings 113 will be lined up with the pin 95 and will hold it up in socket 99 so that the lever 77 can't be lowered and handle 61 can't be released. In other words, lever 57 cannot be connected to pin 59 except in the P. T. O. neutral position.

It will also be seen that the lever 77 cannot be raised unless lever 57 is in the neutral position, since the pin 95 will not be aligned with slot 99 and will abut the end faces 100 of the boss 97. If it should be desired to make it possible to shift the P. T. O. to neutral by pulling up on wire 67 when the lever 41 is in 1—2 or Rev positions, the faces 100 can be tapered so that they will funnel the pin 95 into the center of slot 99 as lever 77 is raised to lift link 91 and pin 95 out of slot 101.

If a single gear P. T. O. is used (e. g. no countergear 31), the controls will obviously still function in the desired manner since it will be impossible because of the P. T. O. design to shift into more than one direction of rotation.

The P. T. O. controls that have been described are accessories that may be added to standard power transmission and P. T. O. systems, the only change required being the casting of boss 97 on the cover 61 and, perhaps, the provision of nose 109 on shoe 39 and hub 107 on gear 35, though for P. T. O. boxes not so equipped other limit stop means, engageable for example with crank 105, could be used as an accessory part. The pin 89 striking the ends of slot 87 can also be used as a limit stop means by making the slot 87 the desired length. If desired to eliminate the casting of boss 97 as a part of the cover, its function can obviously be provided by bolting a strap 115 to the cover by bolts 72 and 72' and folding over a top of the strap and providing such top part with a slot like 99 so that it is comparable to boss 97.

A modified form of safety connection between the selector lever 41 and the shifter crank arm pin 59 is shown in Figs. 11 and 12. In these figures the standard P. T. O. crank arm 201 is fixed to pin 59 so that they pivot together. The rod 51a is clamped to shifter rod 45 as before but is interrupted by a selectively operated disconnect or interlock 203 which must be in rigid, force transmitting condition in order to transmit thrust from rod 51a to the rod 51b which is pivoted at 205 to crank arm 201 by a suitable coupling. The disconnect 203 is carried by a suitable bracket 207 that may be mounted on the truck chassis. Rod 51a is slidably carried in a bracket guided trunnion block 209 that is pivoted on stud 211 on the bracket 207' while the rod 51b is slidably carried in trunnion block 213 that is pivoted on stud 212 on the bracket and on trunnion stud 210. Rod 51a has a block 215 welded to it with a notch 217 and rod 51b has a block 219 welded to it with a notch 221. The push-pull control wire 67 from cab handle 65 is secured at one end 223 to a shifter member 225 that has a curved ear or key 227 for slot or notch 217 and a curved ear or key 229 for notch or slot 221. With the ears in the notches (full line position), rod 51a is operatively connected to rod 51b, the shifter member 225 being shiftable on stud 210 by virtue of a slot 231 therethrough. The length of slot 231 controls the positions to which the selector lever 41 can be moved and, as shown, prevents movement to the 1—3 or higher positions. When wire 67 is pulled up by handle 65 ear 227 is pulled up out of notch 217 but longer ear 229 still remains in notch 221. However, the connection is broken since rod 51a will slide in block 209 relative to the shifter member 225 and selector lever 41 can be shifted throughout its full range. Ear 229 will not go down to permit pivoting of shifter member 225 by wire 67 unless it is aligned with slot 233 in plate 235 that is on bracket 207. The slot 233 is located at the neutral position of the P. T. O. so that disconnection, in the form shown, occurs only with the P. T. O. shifter gear 35 in the neutral position of Fig. 5. Likewise, reconnection can only occur with the P. T. O. in such neutral position.

It is evident that changes in the details of construction shown above may be made without departing from the spirit and scope of the invention.

I claim:

1. In a truck or the like having earth engaging drive wheels, a transmission, power transfer mechanism operatively connecting the transmission to said drive wheels, a selector element operatively connected to said transmission for controlling said transmission, a power take-off system separate from said mechanism and drive wheels for furnishing power to auxiliary devices to be attached thereto and driven through said transmission, said system including a power take-off device operatively connected to said mechanism at a point between said transmission and said wheels, said device having a shiftable gear therein, connection means between said selector element and said shiftable gear whereby said selector element operates both said transmission and said power take-off device, said connecting means including a shiftable member which in one position operates to complete said connection means and which in another position operates to break said connection means, and means separate from said selector element for shifting said shiftable member into said positions.

2. In a power take-off system of the type described, said system including a power take-off unit having a shiftable gear and a pivotal pin for actuating shifting movement of said gear, a lever mounted on said pin but pivotal relative to said pin, a crank arm keyed to said pin to rotate said pin, said lever and said crank arm each having a slot therein, shiftable key means working in one of said slots and movable in and out of the other of said slots, said lever being operatively connected to said crank pin when said key means is in both said slots, and means for shifting said key means into and out of said other slot.

3. In a power take-off system having a take-off device with a shiftable gear therein, a shift rod operatively connected to said shiftable gear, a second shift rod for shifting said first-mentioned shift rod, means for selectively interconnecting said two shift rods, said means comprising a shiftable member having a key connection with both said rods, said member being pivotal into and out of said key connection with said rods, and means for pivoting said member into and out of said key connections.

4. The invention as set forth in claim 3 including means cooperative with said key means for controlling the relative positions of said rods in which said member can be shifted into and out of said key connections.

5. The invention set forth in claim 3 wherein said member is mounted on a stud and has a slot therein receiving said stud, the length of said slot being less than possible joint movement of said rods whereby said slot limits the joint motion of said rods to a predetermined range controlled by the length of said slot.

6. In a power transmission and power take-off system including a main transmission and a selector lever controlling the main transmission, said main transmission having a reverse position and a low speed forward position adjacent to each other, said power take-off system including a take-off unit having means therein including a shiftable actuating member for maintaining the direction of rotation of said take-off device constant despite the change of the main transmission from forward to reverse and vice versa, said shiftable power take-off device member having a neutral position, linkage means operatively connecting said selector lever to said shiftable member and arranged so that said selector lever is in a position substantially midway between said forward position and said reverse position when said shiftable member is in said neutral position, stop means operative upon said linkage means to prevent movement thereof when said selector lever is shifted to a position outside of the range consisting of said reverse and said low speed forward positions, said linkage means including a disconnect device operative to make and to break said linkage, means manually operated for operating said disconnect device, said disconnect device including means providing for operation thereof from a make condition to a break condition and vice versa only when said selector lever is in said midway position and said shiftable member is in said neutral position.

7. In a power take-off control of the type described for a truck having an automatic transmission controlled by a selector lever having a reverse position adjacent to a low speed position, a shift rod operatively connected to said selector lever to be shifted by movement of said lever between said positions, a power take-off device having a gear to mesh with a gear in the main power transmission system, said device including shiftable means for adding a counter gear to maintain a constant direction of rotation despite reversal of the direction of rotation of the main transmission system as the selector lever is moved from a forward to a reverse position and vice versa, said pwer take-off device including a pivotal pin for operation of said shiftable means, a control attached as an accessory to said device including a lever mounted on said pin but rotative relative to said pin, said shift rod being coupled to said lever and upon shifting thereof acting to pivot the lever on the pin, a link having a slot therein through which said pin extends whereby said link is shiftable on the pin, a second lever connected to said link so that pivotal movement of said second lever operates to shift said link relative to said pin, manually operated means for shifting said lever from an operative first position to a second position, said link having a transverse pin therein, said first lever having a slot adapted to receive said link pin when said link is in one shifted position, the cover of said power take-off device having a lock recess therein adapted to receive said link pin when said link is in a second shifted position and said pin is out of the slot in said first lever, said second lever in its operative position being arranged to position said link so that the pin thereof is in the slot of the first lever and when said second lever is in its second position to position the pin on said link in said locking recess, and a crank arm keyed to said pivot pin and having a slot in which said link pin continuously works, whereby when said link pin is in the slot of the first lever pivotal movement of said first lever will be transmitted through said pin to said crank arm and thus to the pivot pin to operate the shiftable means of said power take-off device.

8. In a power take-off system for a truck having a transmission and a selector element operatively connected to said transmission, said power take-off system including a power take-off device with a shiftable gear therein, connecting means between said selector element and said shiftable gear whereby said selector element operates both said transmission and said power take-off device, said connecting means including a shiftable member which in one position operates to complete said connection means and which in another position operates to break said connection means, means separate from said selector element for shifting said shiftable mmeber into said positions, and means associated with said shiftable member and operative to prevent movement thereof to either of said positions unless the selector element is in certain predetermined positions.

References Cited in the file of this patent

UNITED STATES PATENTS

| | | |
|---|---|---|
| 2,034,778 | Storey | Mar. 24, 1936 |
| 2,438,539 | Cook | Mar. 30, 1948 |
| 2,637,221 | Backus | May 5, 1953 |